United States Patent [19]
Wooten, Jr.

[11] Patent Number: 4,751,875
[45] Date of Patent: Jun. 21, 1988

[54] LIQUID BEVERAGE EQUIPMENT

[76] Inventor: Lawrence V. Wooten, Jr., P.O. Box 1072, Wrightville Beach, N.C. 28480

[21] Appl. No.: 812,463

[22] Filed: Dec. 23, 1985

[51] Int. Cl.[4] .............................................. A47J 31/06
[52] U.S. Cl. .......................................... 99/308; 99/317
[58] Field of Search ............... 99/275, 279, 288, 294, 99/298, 300, 307, 308, 309, 316, 317, 321; 426/433

[56] References Cited

U.S. PATENT DOCUMENTS

| | | | |
|---|---|---|---|
| 755,041 | 3/1904 | Peterman | 99/308 |
| 941,009 | 11/1909 | Cauchois | 99/308 |
| 1,094,675 | 4/1914 | Moncrief . | |
| 1,345,947 | 7/1920 | Muller . | |
| 2,547,481 | 4/1951 | Donald | 99/308 |
| 2,770,181 | 11/1956 | Kahan . | |
| 2,870,016 | 1/1959 | Day | 99/275 |
| 2,878,746 | 3/1959 | Schwinger . | |
| 2,971,454 | 2/1961 | Hill . | |
| 3,053,167 | 9/1962 | Joschko . | |
| 3,334,571 | 8/1967 | Matty | 99/307 |
| 3,536,496 | 10/1970 | Paoloni . | |
| 4,146,404 | 3/1979 | Williams . | |

Primary Examiner—Hubert W. Jenkins
Attorney, Agent, or Firm—Fleit, Jacobson, Cohn & Price

[57] ABSTRACT

Liquid beverage equipment for producing a consumable liquid beverage or a liquid beverage concentrate which can be mixed with a liquid diluent such as water to form a consumable beverage. The equipment includes a container for receiving a quantity of liquid such as lot water and a removable receptacle having a quantity of flavor imparting material therein with the receptacle being constructed to enable direct contact between the liquid and the flavor imparting material to form a liquid beverage which then can be removed from the container. The receptacle and depleted flavor imparting material are then removed from the container for disposal of the depleted flavor imparting material. The liquid fills the container to a predetermined level to remain in contact with the flavor imparting material for a predetermined time period before draining the liquid from the container.

4 Claims, 1 Drawing Sheet

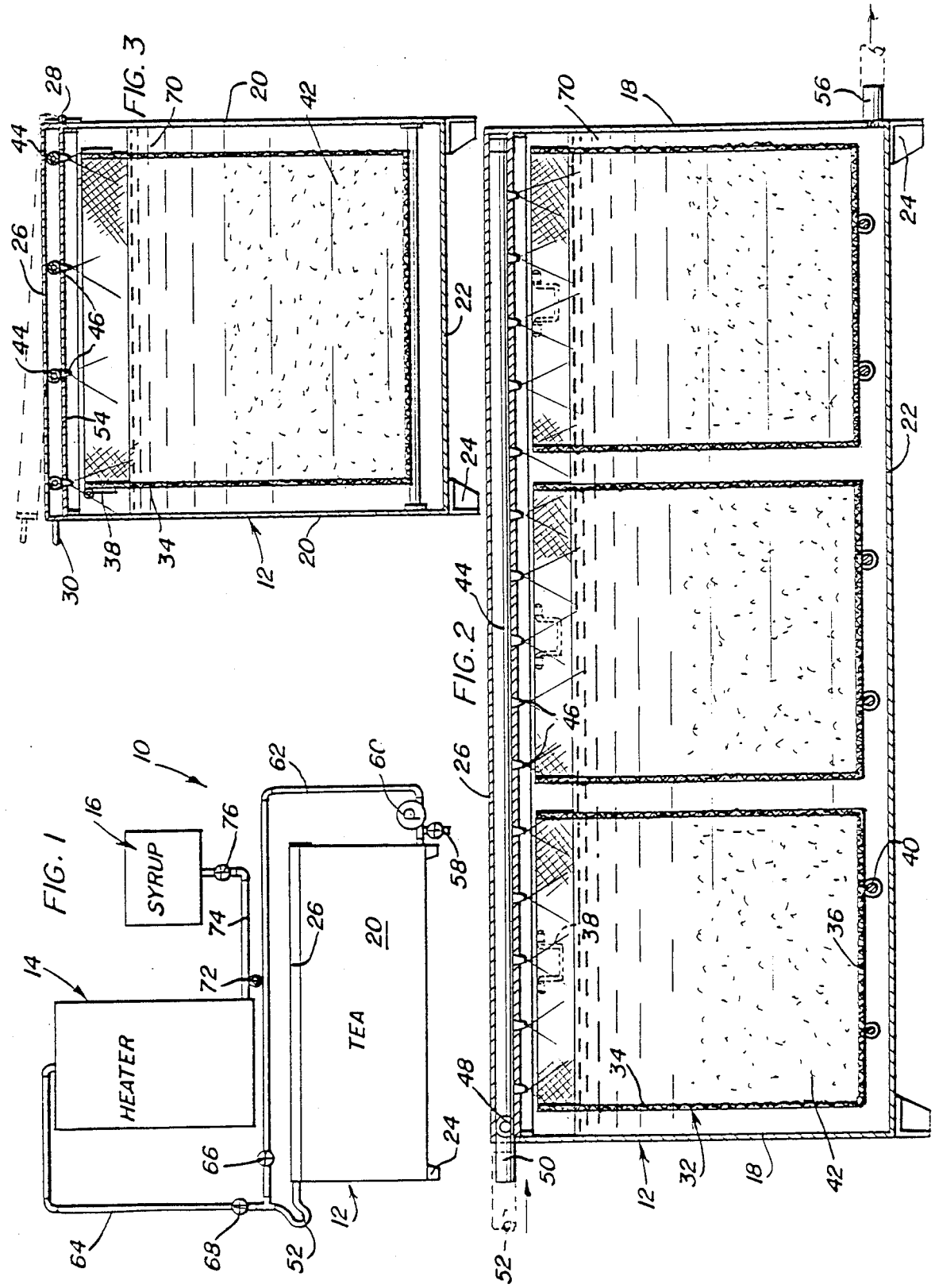

LIQUID BEVERAGE EQUIPMENT

BACKGROUND OF THE INVENTION

1. Field of the Invention

The present invention generally relates to equipment for producing a liquid beverage which may be in the form of a consumable liquid beverage or a liquid beverage concentrate to which a diluent, such as water, must be added to form a consumable beverage. The equipment includes a container for liquid and an insertable and removable receptacle or basket receiving a quantity of flavor imparting material with the receptacle or basket being constructed in a manner to retain the flavor imparting material therein but to enable direct contact between the liquid and the flavor imparting material so that the flavor will be transferred to the liquid. The container includes perforated discharge tubes along the top of the receptacle or basket to discharge liquid directly onto the upper surface of the material in the basket. The container is communicated with a source of liquid such as a hot water heater and includes a drain including a pump by which the liquid beverage or beverage concentrate formed in the container can be recirculated through the container if desired. The time of contact between the liquid in the container and the flavor imparting material in the receptacle or basket may be varied depending upon the desired characteristics of the liquid beverage or beverage concentrate produced by the equipment.

2. Information Disclosure Statement

Various types of beverage infusion devices are well known such as coffee making devices in which hot water is discharge onto the upper surface of a quantity of ground coffee and passes through the ground coffee and through a paper filter for discharge into a receptacle for use. Such devices do not provide any control for the characteristics of the beverage formed other than by varying the ratio of the coffee grounds to the quantity of hot water passed therethrough. While such devices have received considerable consumer acceptance, they require that a supply of paper filters be maintained and also the time of contact between the hot water and ground coffee is extremely limited so that a substantial quantity of ground coffee does not impart flavor characteristics to the brewed coffee. Also, teabags for individual servings of tea are conventionally employed and teapots in which tea leaves are placed along with hot water for steeping is a well known procedure but this procedure usually requires some type of strainer to remove the tea leaves from the consumable beverage.

SUMMARY OF THE INVENTION

An object of the present invention is to provide liquid beverage equipment for producing a liquid consumable beverage or a liquid beverage concentrate to which water or other additives can be added to form a beverage with the equipment including a container for a quantity of liquid, such as water with or without additives, and a removable receptacle or basket for a quantity of flavor imparting material, such as tea leaves or other similar materials, with the container including a spray pipe arrangement in the upper portion thereof for discharging liquid onto the upper surface of the flavor imparting material in the receptacle or basket.

Another object of the invention is to provide equipment in accordance with the preceding object in which the spray pipe arrangement is communicated with a supply of hot liquid such as a hot water heater and the container includes a drain adjacent the bottom thereof communicated with a pump and a discharge valve for optional discharge or recirculation of the beverage or beverage concentrate with the heater being communicated with a source of additive material, such as syrup, sugar and the like, in order to provide a sweetened or unsweetened consumable beverage, beverage concentrate, such as tea or the like.

A further object of the invention is to provide equipment in accordance with the preceding objects in which the container is an elongated rectangular member having a plurality of large receptacles or baskets positioned therein with the upper end of the container including a plurality of spray pipes associated with the flavor imparting material, such as tea leaves, which substantially fill the receptacles or baskets and with the upper end of the container and the spray pipes being movable to an open position to enable a lifting device, such as a folklift truck or the like to engage the upper end portions of the receptacles or baskets to remove them from the container for dumping thereby facilitating the production of large quantities of consumable beverages or beverage concentrates.

Still another object of the invention is to provide equipment in accordance with the preceding objects which is efficient in operation, effective in producing various consumable beverages or beverage concentrates, flexible in installation and use and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a schematic illustration of the equipment of the present invention.

FIG. 2 is a longitudinal, vertical sectional view of the large container with a plurality of receptacles or baskets positioned therein and illustrating the orientation of the spray pipe arrangements and the pivotal upper end of the container.

FIG. 3 is a transverse, sectional view of the container illustrating further details of the construction of the spray pipes and receptacle or basket.

DESCRIPTION OF THE PREFERRED EMBODIMENT

Referring now specifically to the drawings, the equipment of the present invention is illustrated schematically in FIG. 1 and designated by reference numeral 10 and includes a container 12, a hot water heater 14 and an additive container 16 which are interconnected by piping and valves in a manner described in detail hereinafter.

The container 12 is in the form of an elongated, generally rectangular container including parallel, vertical end walls 18, parallel vertical sidewalls 20 and a bottom wall 22 all connected together in a conventional manner with supporting legs or feet 24 being provided on the bottom wall 22 for supporting the container 12 with it being pointed out that the shape and size of the container 12 may vary depending upon the installational requirements and the manner of supporting the container may vary. The top of the container 12 is provided with a top wall or lid 26 having a hinge structure 28 pivotally attaching it to one edge of one of the sidewalls 20 and a handle and latch assembly 30 at the opposite edge for securing the closure wall or lid 26 in closed relation and enabling it to be pivoted to a substantially vertical position to provide unrestricted access into the interior of the container 12.

Positioned in the container 12 is a plurality of receptacles or baskets, each of which is generally designated by reference numeral 32 and which include vertical sidewalls 34 and a horizontal bottom wall 36 constructed of mesh material and preferably constructed of stainless steel although other materials, such as plastics or the like acceptable for use in contact with food products can be used. The receptacle or basket includes an open top provided with pivotal handles 38 or the handles may be fixed so that they extend slightly above the top edge of the opposite sidewalls of the receptacle or baskets 32. The bottom 36 of the receptacle or basket may be provided with supporting wheels to render them movable when out of the container or rigid depending supporting legs or feet may be provided thereon in order to space the bottom 36 of the receptacle or basket 32 from the bottom 22 of the container 12. As illustrated, the receptacles or baskets are spaced from each other and spaced from the end walls and sidewalls of the container 12 and positioning devices to maintain this spatial relation may be provided on the container walls. Each of the receptacles or baskets 32 is provided with a predetermined quantity of flavor imparting material 42 in bulk form, such as tea leaves with the mesh of the walls 34 and 36 of the receptacle or basket 32 being small enough to retain the flavor imparting material therein while freely admitting liquid, such as hot water, into direct contact with the flavor imparting material.

As illustrated in FIGS. 2 and 3, the closure lid 26 is provided with a plurality of longitudinally extending spray pipes 44 which include a plurality of discharge nozzles or openings 46 spaced longitudinally thereon with one end of the pipes 44 being connected by a transverse manifold pipe 48 having a fitting 50 projecting from one end of the closure lid 26 and being provided with a flexible hose 52 connected thereto to enable the closure lid 26 to be opened or closed without disconnecting the hose 52 from the fitting 50. A suitable gasket may be provided around the periphery of the closure lid 26 which may include an inner wall 54 if desired to provide a seal for the container 12. Also, the container 12 includes an outlet fitting 56 at the end opposite to the inlet fitting 50 and oriented at the bottom 22 of the container with the outlet 56 communicating with a valved discharge 58 or a pump 60. The pump 60 includes a discharge pipe 62 extending back into communication with a supply pipe 64 that extends from the top of the hot water heater 14 to connection with the inlet 50 through hose 52 with a valve 66 being provided in the pipe 62 and a valve 68 being provided in the pipe 64 to enable recirculation of liquid 70 from the container 12 at the outlet 56 back into the inlet 50. Also, a valve cross-over pipe 72 is provided in the inlet of the heater 14 with the inlet being designated by numeral 72 and which includes a valve 74 communicating it optionally with the additive container 16 which may include syrup, sugar or other additives in liquid form which can be metered into or added to the water as it enters the hot water heater with the source of water not being illustrated. Thus, with this arrangement, the liquid beverage or liquid beverage concentrate formed in the container 12 may be discharged by opening valve 58 with the pump 60 being inactive and the valves 66 and 72 being closed. Alternatively, the valve 58 may be closed, the valve 66 opened and the valve 68 closed and the pump actuated for recirculating the liquid beverage or beverage concentrate through the container 12 without the recirculated material being heated. As a further option, the valve 72 may be opened and the valve 68 opened and valve 66 closed so that the liquid 70 can be recirculated through the heater and into the container with the valve 76 for the additive being optionally opened or closed although it would normally be closed during recirculation since the syrup, sugar or other additive would be added initially and not added during recirculation.

It is pointed out that the size, shape and configuration of the container and the receptacles or baskets as well as the spray tubes may be varied, in one installation capable of producing large volume batches of tea, the container 12 has a nominal width of 48 inches, height 45 inches and length 84 inches for receiving two standard-sized mesh baskets which are 36 inches in length, width and height. As illustrated, the container may be longer for receiving three standard-sized mesh baskets. The mesh baskets or receptacles 32 are standardized items and the handles 38 enable a conventional industrial forklift truck to engage the handles and lift the basket with the wet tea leaves therein from the container and enabling the forklift truck to transport the container to a point of disposal and enables the forklift truck to invert the basket for dumping the wet tea leaves therefrom with a suitable hose or the like being provided to wash or rinse the tea leaves from the basket so that another supply of tea leaves can be placed therein and the basket placed back into the container.

With the container 12 empty and the mesh baskets placed therein with tea leaves or other flavor producing material therein, a quantity of hot water with or without additives is introduced through the spray pipes and nozzles for discharge onto the upper surface of the material in the baskets for direct contact therewith. When the liquid level in the container reaches a predetermined level, inlet of additional water will be stopped. The drain valve or recirculating pump may be actuated at any desired time delay in order to enable proper steeping of the hot liquid and tea leaves in order to provide a consumable beverage or a beverage concentrate that may be discharged into a holding tank for packaging in suitable containers for consumer use, institutional use and the like. While the disclosure relates specifically to tea leaves which present particular problems due to their bulk and specific gravity characteristics, the presnet invention also can be effectively used with other flavor imparting materials in which direct contact between liquids such as hot or cold water or the like and the material enables the flavor characteristics in the material to be absorbed or transferred to the liquid to form a consumable beverage or beverage concentrate.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An apparatus for making tea concentrate comprising an enlarged container, a quantity of water in the container, a plurality of mesh baskets in the container with the baskets being peripherally spaced from each other and peripherally spaced from the container with the baskets including open upper ends positioned above the level of water in the container with the level of water in the container having its upper surface adjacent the upper end of the baskets, a quantity of tea leaves in each basket immersed in the water for steeping, a plurality of spray pipes with discharge nozzles in the container oriented above the open top of the baskets with the nozzles being arranged in a pattern to discharge water over substantially the entire upper surface of the baskets and tea leaves therein, a water inlet means connected to said pipes, a liquid outlet means at the bottom of the container for removing water and tea flavored concentrate from the container and means interconnecting the outlet means and inlet means for recirculating water and tea concentrate through the water inlet means, pipes and nozzles into the open upper ends of the baskets and tea leaves therein for direct steeping contact between the tea leaves and water with the water or tea concentrate exiting from the container at the outlet means for recirculation through the container or discharge from the container for subsequent use.

2. The structure as defined in claim 1 wherein said container includes an openable top having the pipes and nozzles mounted thereon, each basket including loop-type handles to enable the tines of a forklift truck to lift the baskets from the container for removal and replacement of the tea leaves.

3. The structure as defined in claim 2 together with a liquid heater optionally communicated with the outlet means and inlet means for heating water or recirculated tea concentrate during recirculation, pump means communicated with the outlet means for pumping water or liquid concentrate back to the inlet means or through the heater.

4. An apparatus for making tea flavored beverage comprising an enlarged container, a quantity of water in the container, a plurality of mesh baskets in the container with the baskets being peripherally spaced from each other and peripherally spaced from the container with the baskets including open upper ends positioned above the level of water in the container with the level of water in the container having its upper surface adjacent the upper end of the baskets, a quantity of tea leaves in each basket immersed in the water for stepping, a plurality of spray pipes with discharge nozzles in the container oriented above the open top of the baskets with the nozzles being arranged in a pattern to discharge water over substantially the entire upper surface of the baskets and tea leaves therein, a water inlet means connected to said pipes, a liquid outlet means at the bottom of the container for removing water and tea flavored beverage from the container and means interconnecting the outlet means and inlet means for recirculating water and tea flavored beverage through the water inlet means, pipes and nozzles into the open upper ends of the basket and tea leaves therein for direct steeping contact between the tea leaves and water with the water or tea flavored beverage exiting from the container at the outlet means for recirculation through the container or discharge from the container for subsequent use.

* * * * *